United States Patent [19]

Chavaillaz

[11] Patent Number: 5,108,074

[45] Date of Patent: Apr. 28, 1992

[54] MICROMETRIC METERING DEVICE

[75] Inventor: Georges Chavaillaz, Saint-Sulpice, Switzerland

[73] Assignee: Cynova S.A., Fribourg, Switzerland

[21] Appl. No.: 735,088

[22] Filed: Jul. 24, 1991

[30] Foreign Application Priority Data

Aug. 31, 1990 [CH] Switzerland .................. 2829/90

[51] Int. Cl.$^5$ .............................................. F16K 17/12
[52] U.S. Cl. .................................... 251/205; 251/206; 251/367; 137/625.3; 137/625.33
[58] Field of Search .................. 137/625.33, 625.3; 251/205, 206, 367

[56] References Cited

U.S. PATENT DOCUMENTS

| 2,601,231 | 6/1952 | Smith et al. | 137/625.33 |
| 3,955,591 | 5/1976 | Baumann | 137/625.33 |
| 4,030,518 | 6/1977 | Wilcox | 137/625.3 |
| 4,150,693 | 4/1979 | Genevey et al. | 137/625.33 |
| 4,643,226 | 2/1987 | Bälz | 137/625.33 |

FOREIGN PATENT DOCUMENTS 604376 5/1926 France .................. 251/206

Primary Examiner—A. Michael Chambers
Attorney, Agent, or Firm—Sarby & Darby

[57] ABSTRACT

It comprises a metering valve (11) mounted inside a body (12) provided with an inlet (13) and an outlet (14). The inlet for material (13) is formed in a block (15) housed in a cavity of the body (12) and fixed to the latter by screws (16). The body (12) is provided with a cylindrical cavity (18) obturated by a lateral cover (19) fixed to the body (12) by screws (20). The cavity (18) contains a pusher composed of a first part (21) associated with driving means (22) and of a second part (23) associated with a return spring (24). The valve comprises a slide valve (33) comprising an upper surface (34), a plane lower surface (35) and a traversing conduit (36) formed between the upper surface (34) and the lower surface (35). This slide valve (33) is displaced in a sliding manner on a plate (37) provided with two traversing ducts (38) which communicate with the outlet (14) for the metered material.

13 Claims, 3 Drawing Sheets

MICROMETRIC METERING DEVICE

FIELD OF THE INVENTION

The subject of the present invention is a micrometric metering device comprising a metering valve body, an inlet for material to be metered, an outlet for the metered material and a metering valve mounted inside said body between said inlet and said outlet and capable of being opened or closed.

PRIOR ART

The micrometric metering devices known and most often used are marketed under the designation of proportional valves. The latter comprise a body provided with a cavity, of general cylindrical form, in which there is housed a cylindrical element capable of translational movement. This element comprises peripheral grooves which cooperate with recesses formed in the body in order to permit or prevent the passage of a material to be metered from an inlet duct towards an outlet duct. The sealing of the device depends on the accuracy of the machining of the cylindrical cavity of the body and of the moveable cylindrical element housed in this cavity.

It has been found that this sealing was difficult to achieve because of the clearance which necessarily exists between the wall of the body defining the cylindrical cavity and the outer wall of the moveable cylindrical element in order to avoid frictional forces which are too great during the displacement of this element. This clearance is the source of leaks which falsify the results of the metering. A reduction in this clearance, which would have the effect of improving the sealing, increases the tightness of the parts, and hence the friction and the wear, which leads to the same result as previously, namely the loss of sealing which generates leaks. This constitutes a major drawback of this type of metering device and the present invention aims to provide a solution to this drawback.

SUMMARY OF THE INVENTION

For this purpose, the invention is a metering device, wherein said metering valve comprises a fixed plate provided with a plane surface and equipped with at least one duct communicating with said outlet for metered materials and a slide valve provided with a face disposed to bear on said plane surface of the fixed plate, this slide valve comprising at least one passage arranged so as to permit the flow of the material to be metered towards said duct of the fixed plate, when the slide valve is in one of the positions corresponding to the opening of the metering valve and to stop this flow when it is in one of the positions corresponding to the closing of this valve, and said passage of the slide valve comprises at least one profiled recess formed in at least one of the outside faces of this slide valve, connecting said plane face to said opposite face.

Said profiled recess advantageously has a cross section at least approximately in the form of a V.

According to a preferred embodiment, said passage of the slide valve comprises at least one traversing conduit emerging, on the one hand, on said plane face, and on the other hand, on an opposite face of this slide valve in order to communicate with said inlet for material to be metered.

Preferentially, said slide valve is constituted by a block comprising a lower face which constitutes said plane face bearing on said plane surface of the fixed plate, an upper face opposite to said lower face, two lateral faces and two end faces each comprising a recess having a cross section approximately in the form of a V.

Preferably, said slide valve is associated with driving means arranged so as to linearly displace it in one direction, and with a return spring arranged so as to linearly displace it in the opposite direction.

Advantageously, said block constituting the slide valve is mounted in a central cavity formed inside a longitudinal pusher, this pusher having a first end bearing against said driving means and a second end bearing against said return spring.

Preferably, said driving means comprise an electric motor, but they may also comprise an electro-magnet, or pneumatic or hydraulic means.

In this embodiment, said block constituting the slide valve is mounted in said central cavity between two centering balls respectively engaged in the profiled recesses formed in the end faces of this block.

The device according to the invention advantageously comprises a compression spring arranged so as to exert a pressure on the plane upper face of the block. Said compression spring is mounted between a bearing ring comprising a surface disposed in contact with the upper surface of the block forming said slide valve and a part provided with at least one passage for communication with said inlet for material to be metered.

Preferably, the bearing ring comprises at least one connecting nipple arranged so as to be engaged in the conduit traversing said slide valve.

BRIEF DESCRIPTION OF THE DRAWINGS

The present invention will be better understood by reference to the description of an exemplary embodiment and of the attached drawing in which.

DESCRIPTION OF THE PREFERRED EMBODIMENTS

Figure 1:
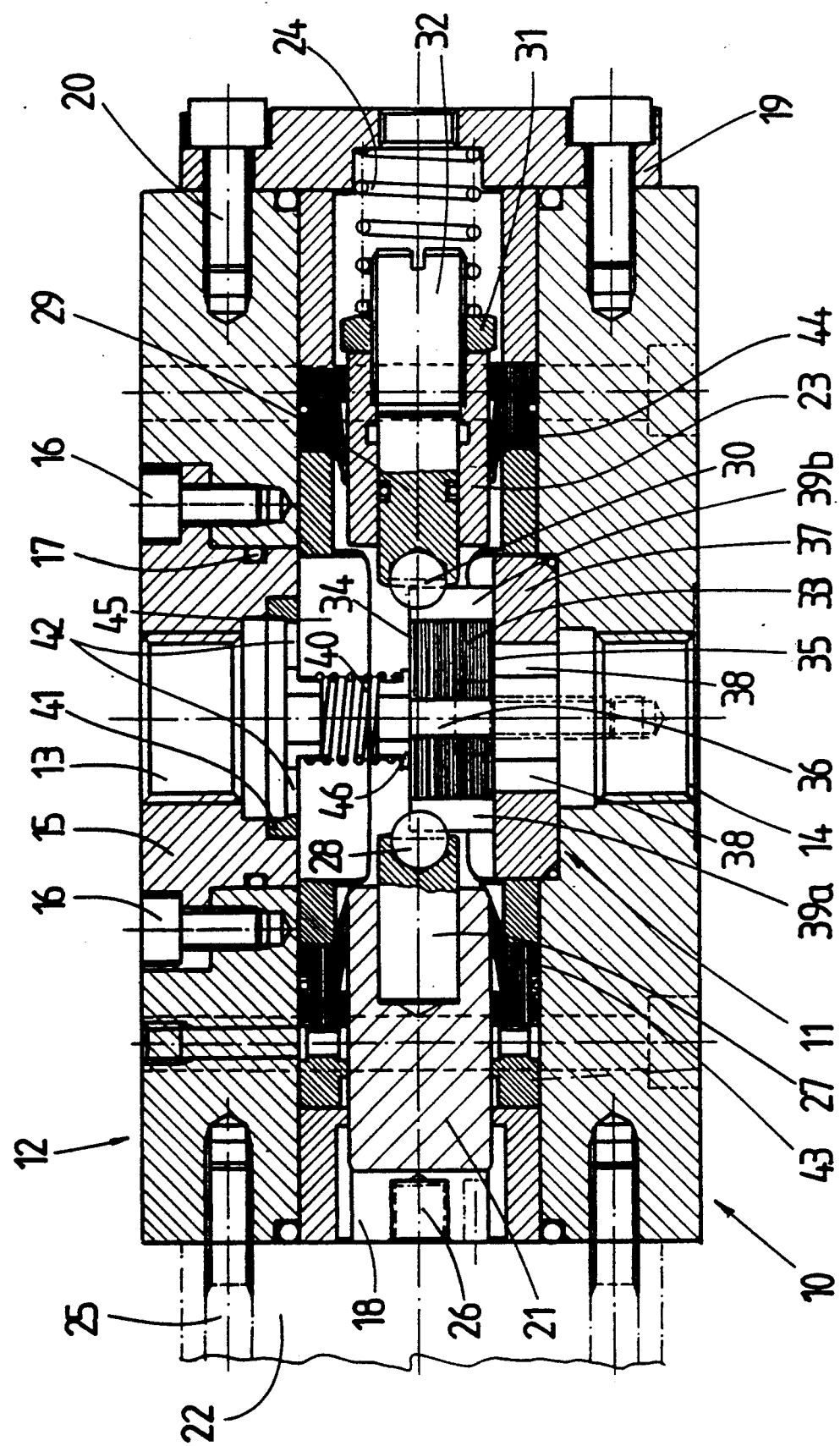
FIG. 1 represents an axial sectional view of the metering device according to the invention, and more exactly, of the metering valve mounted inside the body of this device.

With reference to FIG. 1, the metering device 10 comprises a metering valve 11 mounted inside a body 12 provided with an inlet 13 for a material to be metered and an outlet 14 for the material after its metering. This material to be metered is generally a substance having a liquid or pasty consistency, but could likewise be constituted by a powder, the flow of which approaches that of a fluid.

The inlet for material (13) is formed in a block 15 housed in a cavity of the body 12 and fixed to the latter by countersunk flat-head screws 16. The sealing between this block and the body is ensured by an O-ring 17. The body 12 consists of a single block provided with a cylindrical cavity 18 inside which are mounted the moveable elements of the metering valve. This cavity is obturated by a lateral cover 19 fixed to the body 12 by flat-head screws 20 partially countersunk in the thickness of the cover.

The cylindrical cavity 18 contains a longitudinal pusher composed of a first part 21 associated with driving means 22 and of a second part 23 associated with a return spring 24. These two parts are connected to each other by a central part in which a recess is formed, and are represented more precisely in FIG. 2.

In the example described the driving means 22, which are either an electric, pneumatic or hydraulic motor or an electro-magnet are fixed to the body 12 of the metering valve by means of a screw 25 and comprise a moveable pin 26 which is intended to bear on the rear face of the first part 21 of the pusher. This part 21 of the pusher carries a centering stop 27 in which a ball 28 is mounted. In an analogous manner, the second part 23 of the pusher carries a centering stop 29 on which a ball 30 is mounted. The return spring 24 bears, on the one hand against the cover 19 and, on the other hand, against a locknut 31 which is screwed onto the outside thread of an adjusting screw 32.

The actual metering valve comprises essentially a slide valve 33 constituted by a block comprising an upper surface 34 which may be plane or have another form, a plane lower surface 35 and a traversing conduit 36 formed between the upper surface 34 and the lower surface 35. This slide valve 33 is translationally displaced in a sliding manner on a plate 37 provided with two traversing ducts 38 which communicate with the outlet 14 for the metered material. The slide valve 33 moreover comprises, in its opposite lateral faces, V-profiled recesses, 39a and 39b respectively, in which the balls 28 and 30 engage respectively and which cooperate with the latter so as to ensure a precise centering of said moveable slide valve. These recesses have, or may have, another function which will be described hereinbelow.

The slide valve 33 is pressed against the upper surface of the plate 37 by a compression spring 40 which further bears against an annular part 41 provided with passages for communication 42 which emerge in the inlet 13 of the metering valve.

A profiled sealing ring 43 guarantees the sealing between the first part 21 of the pusher and the body 12 of the metering valve. In an identical manner a profiled sealing ring 44 ensures the sealing between the second part 23 of the pusher and the body 12.

Figure 2:
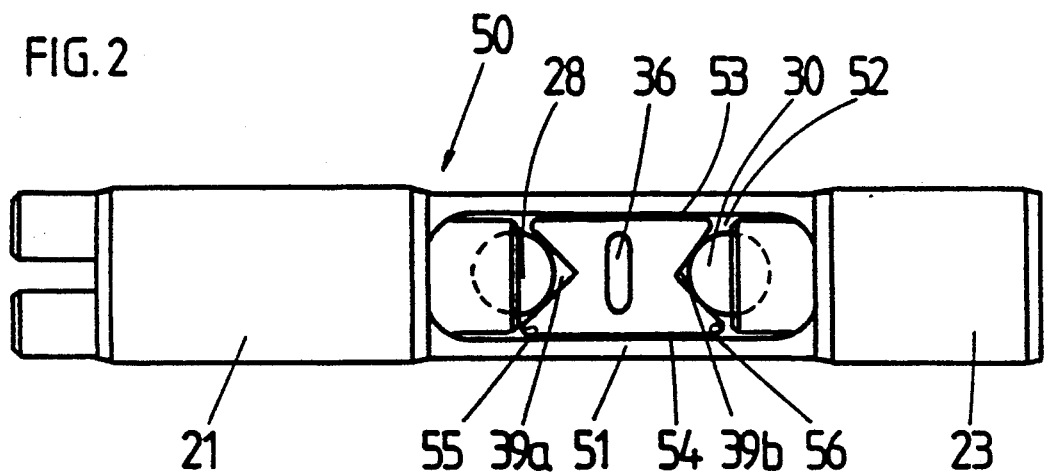
FIG. 2 represents a view from above of the pusher, the slide valve and the centering balls of the latter, this assembly being removed from the body of the device.

FIG. 2 represents the pusher 50 which is composed, as mentioned previously, of a first part 21 and a second part 23, which are rigidly connected to each other by a central part in which a recess 52 is formed. In this recess is essentially housed the slide valve 33 which is formed by a block comprising said upper face 34, said plane lower face 35 two lateral faces 53 and 54 and two end faces 55 and 56 comprising respectively the profiled recesses 39a and 39b, the cross section of which are preferably in the form of a V. However, this form is not obligatory, and could be different in certain embodiments.

It will be noted that the balls 28 and 30 ar engaged in said recesses and ensure a centering function of the slide valve.

The traversing conduit 36 has an oblong form or a substantially rectangular section and occupies, in the example shown, a quasi-central position.

Figure 3:
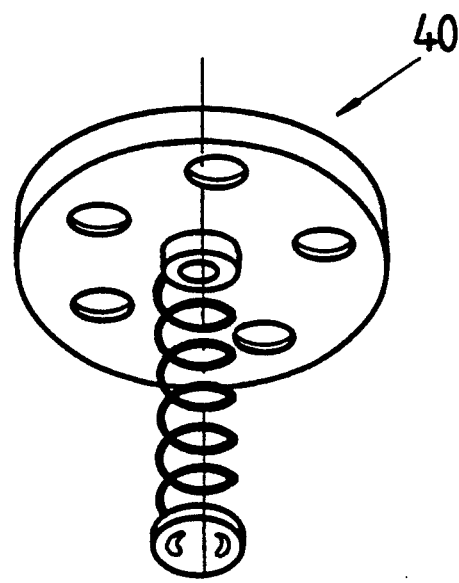
FIG. 3 represents a view in perspective of the compression spring pressing against the upper face of the slide valve.

FIG. 3 represents a view in perspective of the compression spring 40, which presses against the upper face of the corresponding slide valve 33, and the annular part 41 which is mounted in the body 12 below the block 15.

In practice, the metering device operates in the following manner: the material to be metered is supplied to the inlet 13 by appropriate means (not shown) such as for example a conduit connected to a reservoir. The material flows into a chamber 45 formed inside the central cavity 18 through the passages for communication 42. The material may then flow towards one of the traversing ducts 38 by passing via the traversing conduit 36 of the moveable slide valve. As the ducts 38 emerge in the outlet 14, the flow of the metered material takes place freely by this channel.

The position of the moveable slide valve is defined very precisely by the pusher controlled by the driving means and by the return spring which exerts a counterpressure on this slide valve.

Figure 4A:
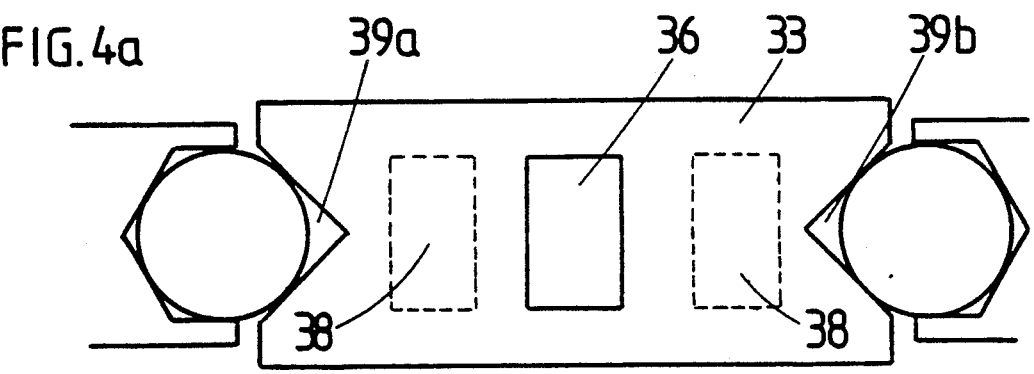
FIGS. 4A, 4B and 4C represent three different positions of the pusher and the slide valve in relation to the ducts of the fixed plate.
Figure 4B:
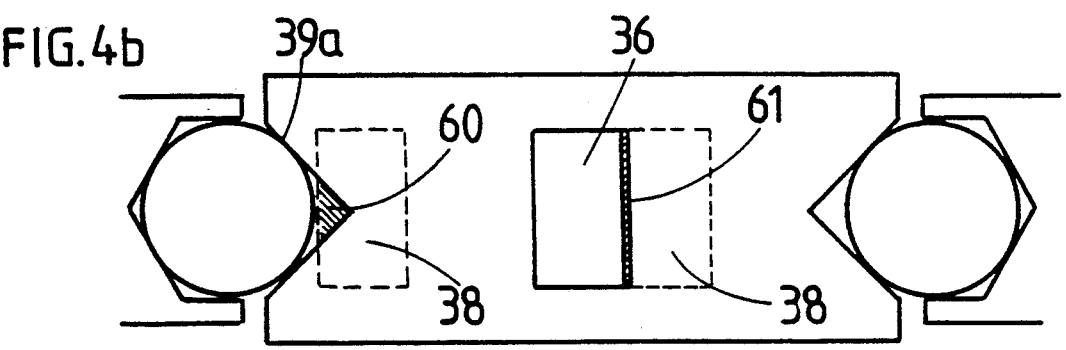
Figure 4C:
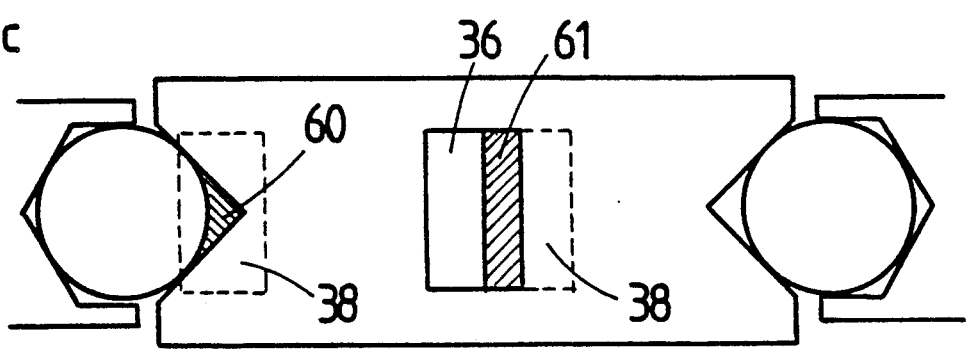

FIGS. 4A, 4B and 4C illustrate the operation of this device. In FIG. 4A, the slide valve 33 is at rest and the metering valve is closed. The traversing conduit 36 is obturated by the fixed plate 37. Likewise, the recesses 39a and 39b are obturated at their base by the fixed plate 37. The traversing ducts 38 of the fixed plate 37 are obturated by the plane lower face of the slide valve.

In the position shown in FIG. 4B, the slide valve has been slightly pushed back and the point 60 of the recess 39a partially covers one of the traversing ducts 38, which permits a moderate flow of material. Likewise, there is observed a small overlap 61 between the traversing conduit 36 and a traversing duct 38 of the fixed plate 37. In this position, a steady metering is ensured.

In the position illustrated in FIG. 4C, the overlap started previously is more complete, which permits a more rapid flow and consequently a greater metering.

The displacement of the moveable slide valve takes place without clearance. The friction of the slide valve, which is in fact the only moveable part of the actual metering valve, against the fixed part, which is the plate 37, is a friction taking place between polished plane surfaces, without any clearance, therefore with no leak. For this reason, the wear of this part being negligible, the lifetime of the metering valve and, consequently, the whole metering device is greatly increased in relation to the known systems. Furthermore, the number of parts composing the device is relatively few and their machining is completely conventional. Preferably, the slide valve and the fixed plate may be made of a ceramic material thus making it possible to have a good sealing between the two surfaces in contact and very little wear.

Of course the present invention is not limited to the embodiment described, but may undergo various modifications and be presented in diverse alternative forms which are evident to those skilled in the art. In particular, the form and the dimensions of the mechanical parts which control the displacement of the moveable slide valve could be changed. Even the form of the block constituting the moveable slide valve could be slightly modified as long as the existence of the flat upper surface 34, the lower surface 35 and that of the duct 36 are preserved.

It will be possible especially to simplify the construction of the pusher, especially as regards the sealing. It is possible to let the product to be metered occupy the entire cavity 18 and merely to ensure the sealing in relation to the outside. Such a construction not only reduces the manufacturing cost but also the maintenance cost of such a device.

I claim:

1. A micrometric metering device comprising a metering valve body, an inlet for material to be metered, an outlet for the metered material and a metering valve mounted inside said body between said inlet and said outlet and capable of being opened or closed, wherein said metering valve comprises a fixed plate provided with a plane surface and equipped with at least one duct communicating with said outlet for metered material and a slide valve provided with a plane face disposed to bear on said plane surface of the fixed plate, this slide valve comprising at least one passage arranged so as to permit the flow of the material to be metered towards said duct of the fixed plate, when the slide valve is in one of the positions corresponding to the opening of the metering valve and to stop this flow when it is in one of the positions corresponding to the closing of this valve, and said passage of the slide valve comprises at least one profiled recess formed in at least one of the outside faces of this slide valve, connecting said plane face to said opposite face.

2. The device as claimed in claim I, wherein said profiled recess has a cross section at least approximately in the form of a V.

3. The device as claimed in claim 2, wherein said slide valve is constituted by a block comprising a lower face which constitutes said plane face bearing on said plane surface of the fixed plate, an upper face opposite to said lower face, two lateral faces and two end faces each comprising a recess having a cross section approximately in the form of a V.

4. The device as claimed in claim 3, wherein it comprises a compression spring (40) arranged so as to exert a pressure on the plane upper face (34) of the block (33).

5. The device as claimed in claim 4, wherein said compression spring is mounted between a bearing ring comprising a surface disposed in contact with the upper surface of the block forming said slide valve and a part provided with at least one passage for communication with said inlet for material to be metered.

6. The device as claimed in claim 5, wherein the bearing ring comprises at least one connecting nipple arranged so as to be engaged in the traversing conduit of said slide valve.

7. The device as claimed in claim 1, wherein said passage of the slide valve comprises at least one traversing conduit emerging, on the one hand, on said plane face and, on the other hand, on an opposite face of this slide valve in order to communicate with said inlet for material to be metered.

8. The device as claimed in claim 7, wherein said slide valve is constituted by a block comprising a lower face which constitutes said plane face bearing on said plane surface of the fixed plate, an upper face opposite to said lower face, two lateral faces and two end faces each comprising a recess having a cross section approximately in the form of a V.

9. The device as claimed in claim 1, wherein said slide valve is associated with driving means (22) arranged so as to linearly displace it in one direction, and with a return spring (24) arranged so as to linearly displace it in the opposite direction.

10. The device as claimed in claim 9, wherein said block constituting the slide valve is mounted in a central cavity formed inside a longitudinal pusher, this pusher having a first end bearing against said driving means and a second end bearing against said return spring.

11. The device as claimed in claim 10, wherein said block constituting the slide valve is mounted in said central cavity between two centering balls respectively engaged in the profiled recesses formed in the end faces of this block.

12. The device as claimed in claim 1, wherein said driving means are electrical or pneumatic or hydraulic or electromechanical means.

13. The device as claimed in claim 1, wherein the slide valve and the fixed plate are made of a ceramic material.

* * * * *